United States Patent [19]

Laurie

[11] 4,386,288
[45] May 31, 1983

[54] STEPPING MOTORS HAVING DETENTED WINDING AND WINDING METHOD

[75] Inventor: William H. Laurie, Plainville, Conn.

[73] Assignee: The Superior Electric Company, Bristol, Conn.

[21] Appl. No.: 266,729

[22] Filed: May 26, 1981

[51] Int. Cl.³ .......................................... H02K 47/00
[52] U.S. Cl. ................................... 310/49 R; 310/71; 310/260; 29/596; 336/192
[58] Field of Search ............... 310/49 R, 194, 43, 45, 310/180, 184, 219, 71, 154, 260, 163, 206, 263, 194; 29/596; 336/192; 339/97 R, 98

[56] References Cited

U.S. PATENT DOCUMENTS

| | | | |
|---|---|---|---|
| Re. 25,445 | 9/1963 | Fredreckson | 310/163 |
| 2,931,929 | 4/1960 | Snowdon et al. | 310/49 R |
| 3,495,109 | 2/1970 | Ames | 310/260 |
| 3,984,908 | 10/1976 | Ackley | 310/71 |
| 4,039,875 | 8/1977 | Morreale | 310/71 |
| 4,225,800 | 9/1980 | Magnaghi | 310/260 |
| 4,260,917 | 4/1981 | Lundin et al. | 310/71 |
| 4,287,446 | 9/1981 | Lill et al. | 310/71 |
| 4,322,649 | 3/1982 | Troeder et al. | 310/43 |

FOREIGN PATENT DOCUMENTS 54-137602  10/1979  Japan ...................... 310/71

Primary Examiner—R. Skudy

[57] ABSTRACT

The disclosed stepping motors have a toothed rotor surrounded by a stator having poles extending toward the rotor, and coils on the poles. At one end of the stator, serial connections between the coils are held at safe positions by detent portions of an annular insulator. Those connections are laid into the detents during the winding process.

7 Claims, 8 Drawing Figures

FIG.5
FIG.6
FIG.4
FIG.7
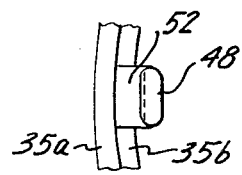
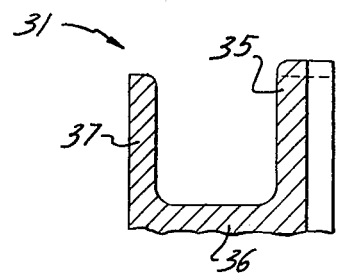
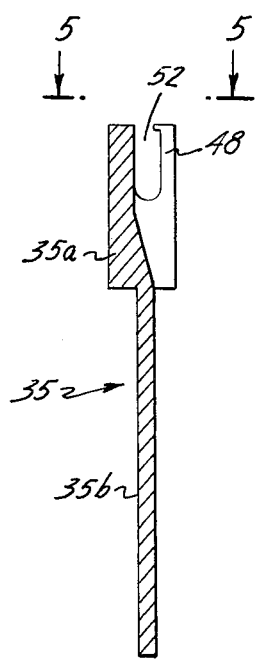
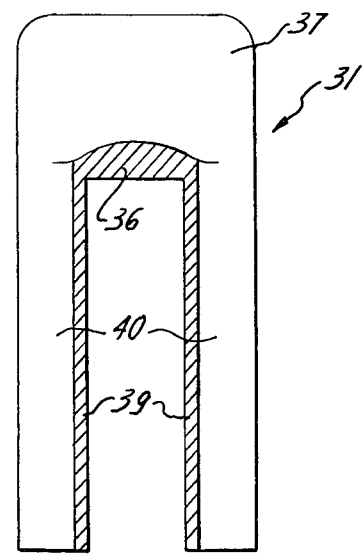
FIG.8
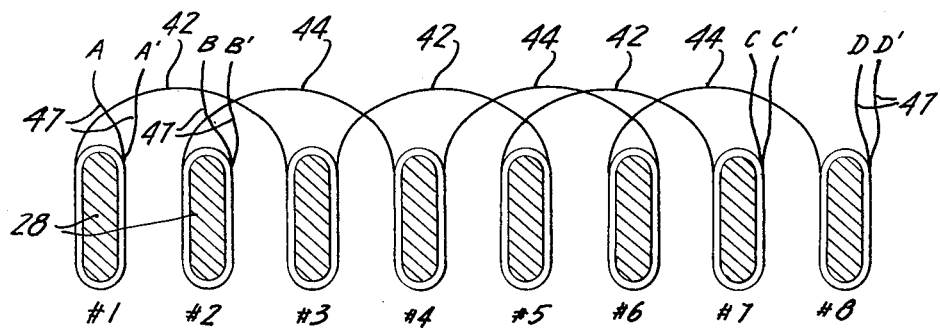

STEPPING MOTORS HAVING DETENTED WINDING AND WINDING METHOD

The present invention relates to motors of the type having serially connected coils on arcuately spaced poles, especially stepping motors.

A well-known type of stepping motor has a rotor bearing teeth parallel to its axis and a stator including poles having teeth parallel to the rotor teeth. Coils on the poles are serially interconnected to form windings, which are excited by A.C. or pulsed D.C. to rotate the rotor in incremental steps. Motors of this type are disclosed, for example, in U.S. Pat. Nos. Re. 25,445 and 2,931,929.

In such motors, the poles of paramagnetic material are elongated parallel to the rotor axis. Coils wound about the poles are insulated from the pole structure of the stator. In a construction that has been standardized for many years, that insulation includes an annular one-piece molded insulator, as disclosed for example in U.S. Pat. No. 3,495,109 to Ames issued Feb. 10, 1970. The annular insulator at each end of the stator includes arms against the ends of the poles, the arms bearing flanges, and an outer ring portion interconnecting the arms.

The coils are commonly "chain-wound" about the poles so as to be interconnected serially, commonly as two bifilar windings. The coil connections are continuous portions of the same fine coated-insulation wire that forms the coils. Coil-to-coil connections were formed as slack loops, which were drawn out of the endwise extensions of the interpole spaces, to allow free access to the interpole spaces during the winding process. After completion of the windings, those loops have routinely been tucked manually into recesses of the coils, to protect them from damage, from the rotor primarily.

In some instances, completed motors have failed due to insulation breakdown where the loops are tucked into the windings. Insulation defects may be discovered during production testing or, if the defect is marginal, they may cause motor failure when the motor is in use. Insulation breakdown at tucked-in loops is thus a factor seriously affecting the costs and the reputation of the manufacturer. Moreover, vibration of a motor sometimes causes tucked-in loops to escape and shift into the path of the rotor. This may result in motor failure due to scraped insulation or sheared wire.

In accordance with the present invention, all incidence of motor failure due to tucked-in coil connections is avoided. Instead, detents are provided for fixing those coil connections in safe locations. Coil interconnections are engaged with these detents in the winding process. The detents are so located as not to interfere with the winding process, out of the endwise-extended interpole spaces. Slack loops between the coils are avoided, eliminating the failures related to such loops and eliminating the cost of manually tucking loops into the coils. In the exemplary yet illustrative embodiment of the invention described in detail below and shown in the accompanying drawings, the detents are part of a ring of molded insulation at an end of the stator. Those detents are located generally in the arcuate spaces between the ends of successive coils, but they are at a radius large enough to allow easy access to the interpole winding space. The detents provide wire-containing slots that open away from the end of the stator. The customary winding process is modified so that, as each coil is completed, its connection to the next coil is laid into a detent and slack in the connecting wire is taken up as winding of the next coil starts. The new process eliminates slack coil-connecting loops and their associated difficulties.

The nature of the invention and its further features and advantages will be better understood and appreciated on the basis of the following detailed description of a presently preferred illustrative embodiment shown in the accompanying drawings.

In the drawings:

FIG. 4 is a cross-section of the component of FIG. 3 at the plane 4—4 therein;

FIG. 5 is a cross-section of the component in FIG. 3 as seen from the plane 5—5 in FIG. 4;

Figure 3:
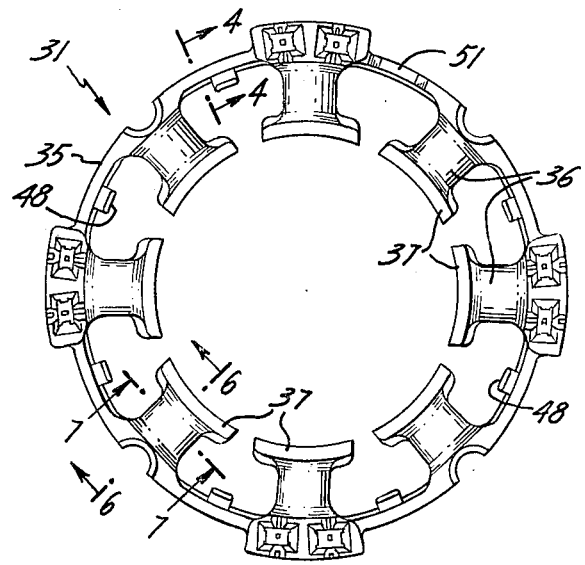
FIG. 3 is a view of a component of the motor of FIGS. 1 and 2, as seen from plane 2—2 in FIG. 1.

FIGS. 6 and 7 are cross-sections of the component of FIG. 3 as seen from the planes 6—6 and 7—7 therein; and FIG. 8 is a diagrammatic representation of the stator windings.

Referring now to the drawings, the illustrative stepping motor includes a stator 11 and a rotor 12. The rotor has a shaft 13 supported in ball bearings 14 and 15 that are in turn mounted in end bells 16 and 17 respectively. The shaft carries a permanent magnet 18. Pole pieces 19 and 20 are clamped to the ends of magnet 18. Teeth 21 parallel to shaft 13 are formed on the periphery of each of the end caps 19 and 20. The teeth on each end cap are aligned with the gaps between the teeth of the other end cap.

End bells 16 and 17 are clamped against cylindrical shell 22 by two or four screws 23.

Force fitted against the interior of shell 22 is a pole-structure unit 24 in the form of a stack of paramagnetic laminations. Unit 24 includes an outer annular portion 25 and eight poles 26 that project inward and bear enlarged pole pieces 27. Teeth 27a are formed on the faces of pole pieces 27 opposite to rotor 12 and separated therefrom by an air gap. The poles are elongated parallel to the motor axis and its teeth extend along the poles 26. Connecting portion 28 of each pole (FIG. 2) extends between annular portion 25 and the respective pole piece 27. Each lamination of the stack comprises part of portions 25, 27 and 28.

The ends 29 and 30 of pole-structure unit 24 are flat. Annular insulators 31 and 32 are positioned against the ends of unit 24. Portions of insulators 31 and 32 cover pole portions 28 (as is more fully described below), and coils 33 are wound about the insulation-covered pole portions 28. Each pole in the illustrative form of motor carries two coils, being wound together as bifilar conductors (FIG. 8).

Molded insulator 31 is shown separately in FIGS. 3–7 inclusive. Annular ring portion 35 includes a flattened ring portion 35a flattened in cross-section (FIG. 4) and a cylinder, the shell 35b. Eight equally spaced arms 36 (FIGS. 3 and 7) lie against one end of pole portion 28, terminating in flange portions 37. Portions 39 of insulator 31 extend from arm 36 and cover both lateral surfaces of pole portions 28. Flanges 40 extend from flanges 37 and from pole-covering insulator portions 39.

Insulator 32 is the same as insulator 31 as thus far described. Portions 35a, 36 and 37 of insulator 31 and the corresponding portions of insulator 32 contain the end portions of the coils. Shell 35b together with portions 39 and pairs of flanges 40 at each side of each pole contain the elongated sides of the coils. These channel portions 35a, 36, 37 and 35b, 39, 40 of insulator 31 and the corresponding (and complementary) portions of insulator 32 collectively form a continuous insulating channel about each pole portion 28. There may be a coating of insulation on pole structure 28, so that portions 35b, 39 and 40 of insulators 31 and 32 may optionally be omitted. The insulators as thus far described are conventional.

In FIG. 8 there is shown diagrammatically an illustrative configuration of bifilar chain-wound coils interconnected as two windings. It includes two bifilar windings extending about the eight pole portions 28. There are two coils for each of the poles which are designated #1, #2 . . . #8, one coil of each winding on each of the poles. Thus, each of the windings A–C and A'–C' is continuously chain-wound alternately clockwise and counterclockwise about the four poles #1, #3, #5 and #7, two coils on each pole. Correspondingly, each winding B–D and B'–D' is continuously wound alternately clockwise and counterclockwise around poles #2, #4, #6 and #8, two coils on each pole. Stepwise rotation of the rotor results from energizing the windings by well-known switching means or by AC networks.

The bifilar windings A–C and A'–C' include two-conductor coil-interconnections 42 linking its coils, while bifilar windings B–D, B'–D' include two conductor coil-interconnections 44 linking its coils. The wire portions 47 at the end of the windings extend to eight metal terminals 46 (FIG. 2) which are set into insulator 31. These terminals have external connection wires 49. The bifilar windings are of fine wire covered by a coating of enamel or other suitable insulation. This coating insulates the turns of each winding against being short-circuited and it insulates the coils on each pole from each other. In a past practice, coil connections 42 and 44 along each winding were in the form of slack loops, formed in the course of producing the windings. Those loops were held away from the endwise extensions of the interpole spaces, to allow free access to those spaces for winding the coils. Those loops have been tucked manually into the coils on the poles, after completion of the windings, for locating them safely out of position where they might be damaged, especially by the rotor.

Figure 1:
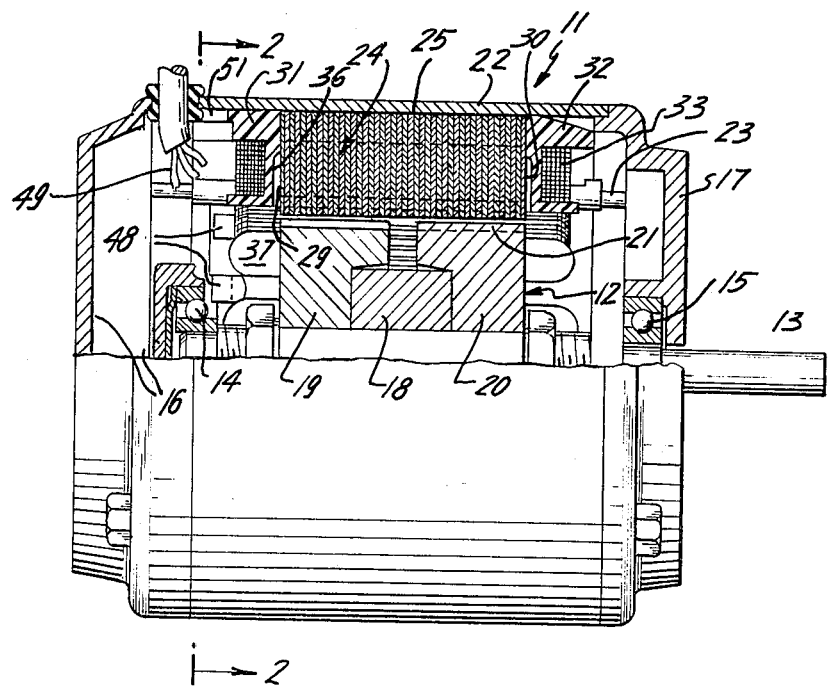
FIG. 1 is an elevation of an illustrative motor embodying features of the present invention, shown partly in cross-section.
Figure 2:
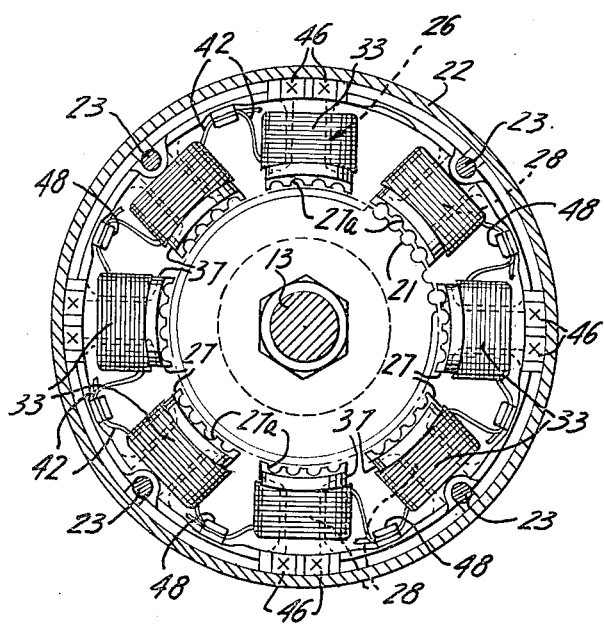
FIG. 2 is a cross-section taken at the plane 2—2 of FIG. 1.

The illustrated motor includes detents 48 of insulation to secure coil-connecting portions of the windings in safe, stable positions. More particularly, detents 48 engage the coil-connecting portions 42, 44 and 47 at positions spaced arcuately from the poles as viewed from an end of the stator (FIGS. 1 and 2), and the detents are located sufficiently outward (radially) of the interpole spaces to avoid interference with the process of chain-winding the axially connected coils on the poles (FIGS. 2 and 8). These detents are at positions generally described as between the arcuately spaced ends of the coils (FIG. 1) but spaced from the rotor axis by a distance that approximates the radially outer extent of the poles, thus also approximating the inner diameter of the annular portion 25 of the pole-structure unit 24. The detents have slots 52 (FIGS. 4 and 5) that are parallel to the nearby portion of ring portion 35a of insulator 31, or tangent to a circle about the motor axis. Moreover, the slots 52 open away from the end of the stator. Bifilar windings A–C and A'–C' are chain-wound about successive poles (FIG. 8) and as the coils about each pole are completed the continuous wire of the windings is laid into a detent 48 as connections between the just-wound coils on one pole and the coils to be wound on the next pole. Bifilar windings B–D and B'–D' are wound in the same way. The coil interconnections need not be taut, but the slack is taken up. Slack loops are avoided as a means for retaining the connections in slots 52. End connections 47 may similarly be laid into these detents where appropriate. The detents and the winding procedure of laying-in the coil interconnections and taking up risky slack applies both when the winding process is performed manually and when the process is automated.

It is understood that detents 48 are provided where required and are used for most but not necessarily all of the coil connections of a winding. Thus, some end connections 47 may extend directly from a coil to a terminal 46, without need for a locating detent 48. Similarly, there may be no need for a detent 48 in every one of the spaces between each of the poles. In the illustrative motor there are only seven detents 48 on the insulator 31. There is a notch 51 opposite one of the arcuate interpole spaces, to accommodate an insulating grommet for external connections 49.

The illustrative embodiment of the invention shown and described represents a presently preferred application of the invention, but it is susceptible of being modified and applied variously by those of ordinary skill in the art. Consequently the appended claims should be construed in accordance with the true spirit and scope of the invention.

What is claimed is:

1. An electric motor comprising a rotor and a stator, said stator including a pole-structure unit of paramagnetic material comprising an annular portion surrounding and spaced from said rotor and having a plurality of poles mutually spaced apart arcuately and extending from said annular portion toward said rotor, plural windings each consisting of a continuous length of wire and each winding including coils on a plurality of said poles and insulated therefrom, each of said windings having connecting wire portions serially interconnecting the coils thereof, and plural detent means in respective positions essentially outside the endwise extensions of the interpole spaces for holding said connecting wire portions in position, said connecting wire portions being essentially free of slack.

2. An electric motor as in claim 1 wherein said detent means are located approximately between arcuately spaced end portions of the coils on said poles and spaced from the rotor axis by a distance that approximates the radially outer extent of the poles.

3. An electric motor as in either of claim 1 or 2 wherein said stator includes a ring portion of insulation at an end of the pole-structure unit, end portions of all said coils being surrounded by said ring portion, and wherein said detent means are carried by said ring portion.

4. An electric motor as in claim 2 wherein said stator includes a ring portion of insulation surrounding respective portions of said coils at an end of the stator and wherein each of said detent means is a formation extending from said ring portion as a one-piece portion thereof.

5. An electric motor as in any of claims 1, 2 or 4, wherein each said detent means is formed to provide a slot generally tangent to a circle centered at the rotor axis, said slot opening away from said annular portion of the pole-structure unit.

6. An electric motor as in claim 1 wherein each said pole includes a pole piece extending arcuately about part of the rotor and a connecting portion between the pole piece and said annular portion of the pole-structure, said pole piece extending across and arcuately to opposite sides of the radially innermost end of said connecting portion, said pole-structure comprising stacked laminations each integrally including a portion of said annular portion and of said connecting portion and of said pole piece, each said coil extending about said connecting portion and each said coil having its sides disposed at least partially between said annular portion of its pole structure and those portions of its pole structure that extend arcuately to opposite sides of said connecting portion.

7. A stepping electric motor comprising a toothed rotor and a stator, said stator including a pole-structure unit of paramagnetic material having an annular portion surrounding and spaced from the rotor and having a plurality of axially elongated toothed poles spaced from each other arcuately and extending inward from the annular portion toward the rotor but spaced therefrom by an air gap, an insulator at least at one end of said pole-structure unit including a ring portion and a plurality of arcuately spaced flange portions unified with said ring portion by arms extending inward therefrom, said arms and flanges being disposed at one end of said pole-structure unit, a plurality of windings including coils about said poles and said arms, each of said coils having an end portion between said ring portion of said insulator and a respective one of said flanges, each of said windings including connecting wire portions serially interconnecting the coils thereof, and detents for said connecting wire portions, said detents extending from said ring portion and located roughly between end portions of the coils of the successive poles and at a radial distance from the motor axis that approximates the inside diameter of said annular portion of the pole-structure unit.

* * * * *